Aug. 25, 1931.  R. K. LEE  1,820,232
VIBRECORDER
Filed March 2, 1925   4 Sheets-Sheet 1

Inventor
R. Kenneth Lee
By Spencer, Sewall & Hardman
his Attorneys

Aug. 25, 1931.  R. K. LEE  1,820,232
VIBRECORDER
Filed March 2, 1925  4 Sheets-Sheet 2

Inventor
R. Kenneth Lee

By Spencer, Sewall and Hardman
his Attorneys.

Aug. 25, 1931.            R. K. LEE            1,820,232
VIBRECORDER
Filed March 2, 1925            4 Sheets-Sheet 3

Inventor
R. Kenneth Lee

By Spencer, Sewall & Hardman
his Attorneys.

Aug. 25, 1931.    R. K. LEE    1,820,232
VIBRECORDER
Filed March 2, 1925    4 Sheets-Sheet 4

Inventor
R. Kenneth Lee
By Spencer, Sewall & Hardman
his Attorneys.

Patented Aug. 25, 1931

1,820,232

UNITED STATES PATENT OFFICE

ROGER KENNETH LEE, OF DAYTON, OHIO, ASSIGNOR TO GENERAL MOTORS RESEARCH CORPORATION, OF DAYTON, OHIO, A CORPORATION OF DELAWARE

VIBRECORDER

Application filed March 2, 1925. Serial No. 12,622.

This invention relates to improvements in devices adapted to detect vibrations in objects and delineate the frequency and amplitude of these vibrations permanently on a record-receiving surface.

It is among the objects of the present invention to obtain a graphic record of the frequency and amplitude of vibrations of any structures vibrating or being vibrated and more particularly to such structures as are set in vibration by machinery as, for example, internal-combustion engines and other automotive equipment.

Another object is to obtain on the same chart or recording surface, a graphic record of the cycle of operation of some definite part of the device being tested for vibrations, so that the relation between the cycle of operation and the vibration curve is readily discernible on the chart.

A further object is to provide a device of simple structure and design, and of minimum weight, so as to permit it to be held in the hands of the operator while it is being used and to facilitate the manipulation of the device under all conditions and especially when the device is utilized in close quarters.

In carrying out these objects, this invention provides a device including a movable element or feeler which may be held against any object the vibration of which it is desired to determine. The motion imparted to this feeler is transmitted to a marker which engages with a record sheet on which the marker delineates the frequency and amplitude of the vibrations. The record sheet may be mounted on a record-receiving member, such as a governor-controlled, spring-operated drum, which when released by the operator, makes one revolution at uniform speed. In order to show the relation which the vibration curve bears to some definite part of the cycle of operation of the object tested, the device is provided with a quick-acting electro-magnet which operates a second marker adapted to make a graphic record on the record sheet. The magnet is connected to a source of current by means of a make-and-break device operated at some known point in the cycle, thereby causing a sudden shifting of the second marker which makes a jog in the line on the record sheet. From this line all of the vibrations recorded can be studied in their relation to the movements of parts of the object tested.

Further objects and advantages of the present invention will be apparent from the following description, reference being had to the accompanying drawings, wherein a preferred form of the present invention is clearly shown.

Figure 1:
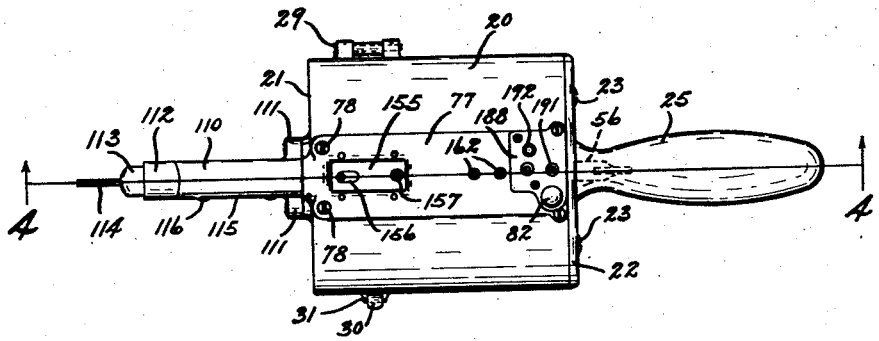
Fig. 1 is a plan view of the device.
Figure 2:
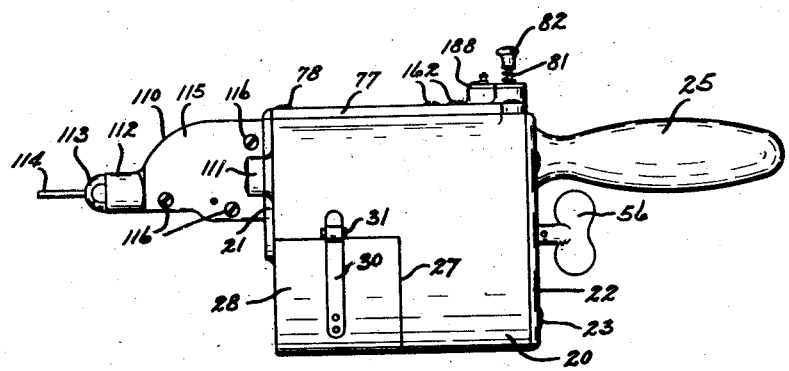
Fig. 2 is a side elevation.
Figure 4:
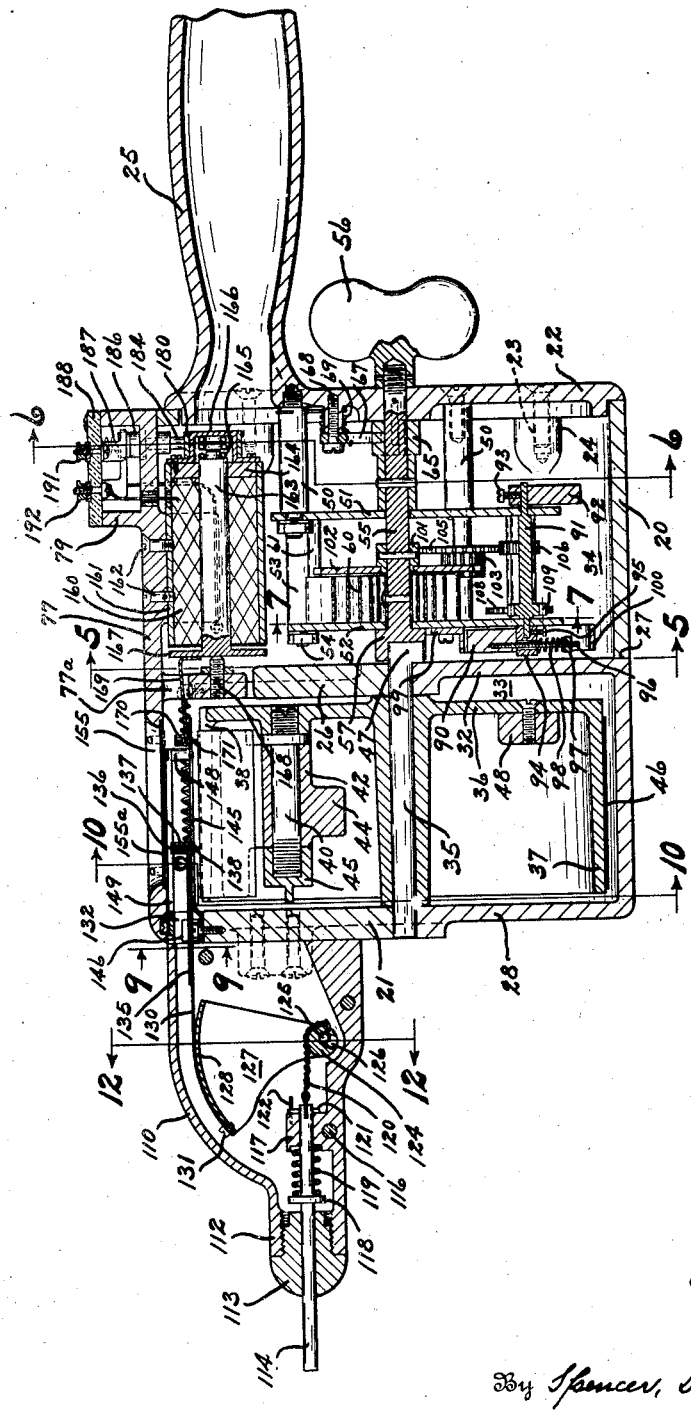
Fig. 4 is a longitudinal section taken along the line 4—4 of Fig. 1.

Referring to the drawings and more particularly to Figs. 1, 2 and 4, the device is shown comprising a main housing 20 cylindrical in form, having an end wall 21 formed integral therewith. The opposite end of the housing 20 is provided with an end cover 22 secured thereto by screws 23 which screw into lugs 24 formed on the inside of the housing. A handle 25 is provided on this end cover 22.

A partition wall 26 is formed in the upper half of the main housing 20, intermediate the end 21 and the end cover 22. The lower edge of said wall is substantially on a line with the axis of the housing 20.

Figure 10:
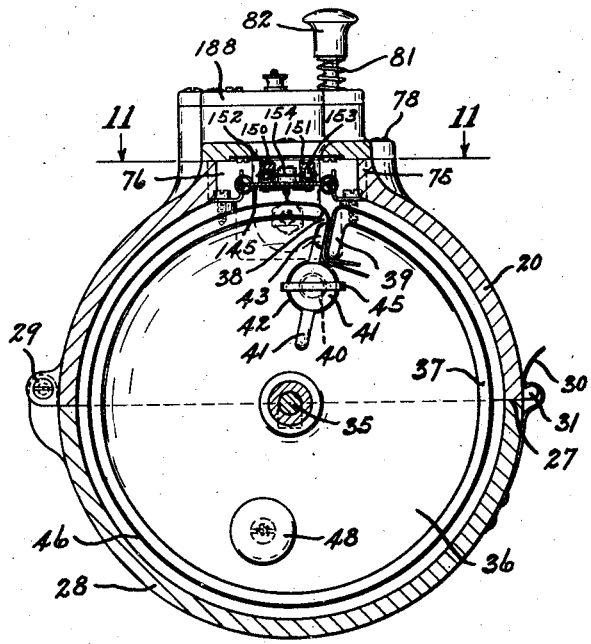
Fig. 10 is a fragmentary view taken on line 10—10 of Fig. 4.
Figure 12:
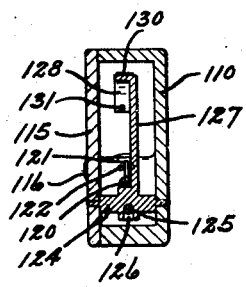
Fig. 12 is a detail section taken along line 12—12 of Fig. 4.

The front and lower portion of the housing has an opening 27 to receive a door or hinged cover 28 of such a conformation that when in closed position as shown in Figs. 2, 4 and 10, completes the cylindrical shape of this portion of the housing 20 as well as the end wall 21. This door 28 is hinged to the housing 20 by a pin 29.

A spring clip 30, carried by the door 28 is adapted to hold the door in closed position by engaging with a lug 31 formed on the main housing 20. The door 28 is provided with a partition 32 which, when the door is in closed position, forms a continuation of the partition wall 26, thus these two partitions 26 and 32 form a complete dividing wall in the housing 20, which in turn provides two chambers 33 and 34 in the interior of the housing.

The lower edge of the end wall as well as the partition wall is provided with a semi-circular notch which cooperates with corresponding but oppositely-disposed notches in the door 28, to form bearings for the ends of shaft 35 so that said shaft will extend across the chamber 33 axial of the housing 20. This construction permits removal of the shaft from the housing when the door 28 is opened.

Within the chamber 33 and carried by and rotatable with the shaft 35 is a drum 36. Referring particularly to Figs. 4 and 10, the drum is shown having a peripheral flange 37. A slot 38 is provided in the flange 37. The one edge of the flange at the slot is turned inwardly toward the axis of drum to form an abutment shoulder 39. Within the drum 37 there is provided a stud 40 secured to the drum casing so as to position said stud parallel to the shaft 35. A clamping element 41 comprising a hub 42, a clamping ear 43 and a grip portion 44 is loosely carried by said stud 40 so that the clamping ear may be moved toward and against the abutment shoulder 39. The outer end of the stud is screw-threaded to receive the thumb nut 45, which when tightened tends to hold the clamping element 41 in desired position.

The drum 36 is adapted to support the record sheet 46 carried about the peripheral flange 37. The ends of the paper are inserted in the slot 38 and placed between the clamping ear 43 and abutment shoulder 39. The grip portion is forced in a clockwise direction to cause the clamping ear 43 tightly to clamp the paper against the shoulder 39 after which the thumb nut is tightened to maintain the element in record-sheet-clamping position. The numeral 48 designates a counterweight in the drum 36 to counterbalance the same.

In Fig. 4, the shaft 35 is shown extending through and beyond the dividing wall including portions 26 and 32. This end of the shaft 35 has an extension 47 provided for purposes to be described.

The means for rotating the drum 36 is carried in the housing chamber 34 and is clearly illustrated in Figs. 4, 5, 6 and 7. This means is carried by the cover plate 22 which being removable from the housing 20 makes the rotating means easily accessible. The end cover 22 has a plurality of posts 50 secured thereto in any suitable manner, which support a plate 51, parallel with the cover plate 22. Another plate 52 parallel with the plate 51 and spaced therefrom is supported by posts 53 having their one ends riveted to plate 51 while the other ends receive nuts 54 which hold the plate 52 in position on the posts.

Extending across the chamber 34 in direct alinement with the drum shaft 35 is the drive shaft 55 having its bearings in the plate 52 and the end cover 22. The shaft extends beyond the outer surface of said end cover and has a winding handle 56 secured thereto. The opposite end of this shaft 55 has an enlarged head portion 57 provided with an indent so formed and arranged as to receive the extension 47 provided on the drum shaft 35. This provides a driving connection between the two shafts 55 and 35 which permits easy removal of the drum from the housing.

The numeral 60 designates a flat, coil spring positioned between the plates 51 and 52 so as to be adjacent the latter. One end of the spring is anchored to a post 61 interposed and supported between the two plates 51 and 52. The other end of the spring is secured to the drive shaft 55 by means of a rivet and in such a manner that the shaft 55 may be rotated by the winding handle 56 so as to wind the spring and create a tension therein. Rotation of the shaft 55 in a counter-clockwise direction as viewed in Fig. 7 will cause the spring 60 to be wound.

In order to maintain the spring 60 in wound or tensioned condition, until the operator desires to cause rotation of the drum 36, there is provided a self-locking device in connection with the shaft 55. This is clearly illustrated in Figs. 4 and 6. This device includes a hub 65 pinned on the shaft 55 between the plate 51 and the end cover 22. The hub is provided with a projecting lip 66. A pawl 67 is fulcrumed on screw 68 secured to a boss on the end cover 22 said pawl being held in engagement with the hub 65 by means of a coil spring 69 anchored to one of the posts 50. Thus, when the shaft 55 is rotated to wind the spring 60 the lip 66 will pass under the pawl 67 which will prevent the spring from unwinding when the handle 56 is released by the operator. The pawl has an extending portion 70 which is adapted to be engaged by the trigger 71.

Figure 5:
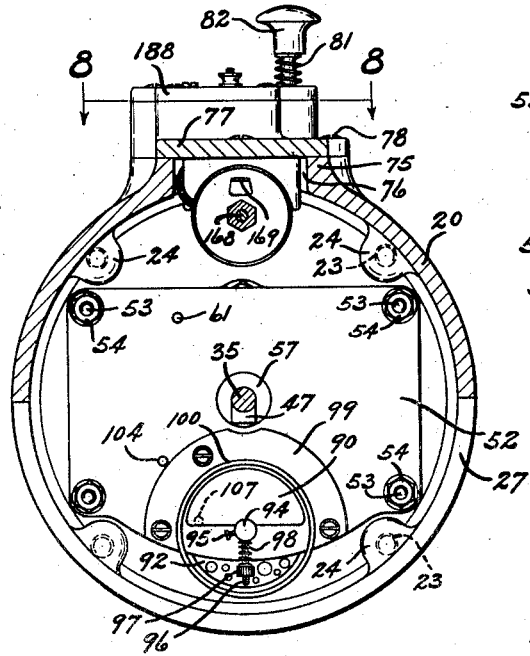
Fig. 5 is a transverse section taken on the line 5—5 of Fig. 4.
Figure 6:
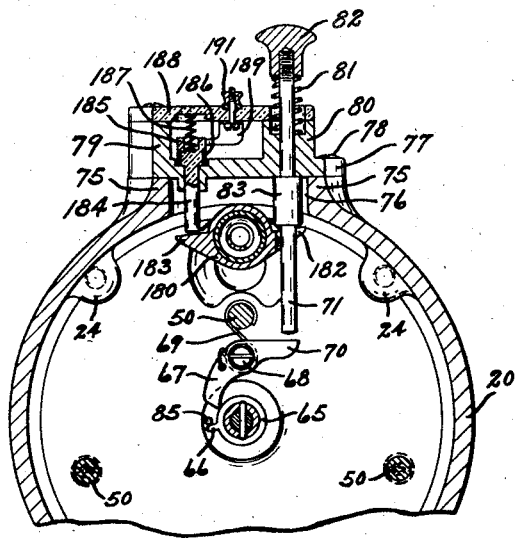
Fig. 6 is a section taken on line 6—6 of Fig. 4.
Figure 9:
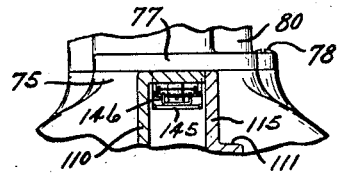
Fig. 9 is a detail section taken along line 9—9 of Fig. 4.

As viewed in Figs. 5, 6 and 10, the main housing 20 has a flange 75 which surrounds an opening 76 in the upper portion of said housing. A cover 77 is provided for this opening and is held in place by screws 78. The cover has an extending shell portion 79 which forms a separate housing for electrical devices to be described hereinafter. The shell portion 79 has a lug 80 formed thereon, which is bored to receive the trigger 71. A counterbored portion in the lug 80 forms a shoulder against which one end of a coil spring 81 abuts. The other end of the spring pushes against the bottom of an operating button 82 carried by the trigger 71. An enlarged portion 83 limits the movement of the trigger 71 due to the action of spring 81.

A pin 85 is anchored to the end cover 22 so as to be in the path of travel of the lip 66. This pin is so positioned relative to the end of the pawl 67 that it acts as a stop which the lip 66 will engage, to limit the winding operation when said lip has passed beneath and is engaged by the pawl 67. This prevents a reversal of motion of shaft 55 due to the action of spring 60. When the button 82 is depressed to cause the trigger 71 to engage and move extension 70, the pawl 67 will be moved to release the lip 66, permitting the spring 60 to rotate the shaft 55 clockwise until the lip 66 engages the pin 85 on its opposite side. Thus the shaft is rotated substantially one revolution. Initially the spring 60 is anchored to the post 61 so that after the spring has rotated the shaft 55 and the lip 66 has engaged the pin 85 to stop rotation of said shaft, the spring will still be under tension. This is done to obtain spring tension on the shaft 55 for its full revolution.

In order to maintain the rotating speed of the shaft 55 substantially uniform there is provided a governor (see Figs. 4 and 5) which comprises a shaft 91 interposed between and having its bearings in plates 51 and 52. This shaft extends beyond the plate 51 and has a counterweight 92 secured thereto by means of a set-screw 93. The opposite end of this shaft 91 extends beyond the plate 52 and carries a hub 94 adjustably secured thereto by means of the set-screw 95. A semi-circular centrifugal element or disc 90 has a screw-threaded stem 96 which slidably extends through a hole in the hub 94 at right angles to the axis of said hub. The stem carries an adjusting nut 97. Between the hub 94 and nut 97 there is provided a coil spring 98 which tends to hold the disc 90 on the hub 94. A friction drum 99 is secured to the plate 52, having a circular flange 100 concentrically arranged with the hub 94 and of such an inside diameter as to provide a clearance between the disc 90 and the inside surface of flange 100 when the disc is resting on the hub 94. However, when said hub rotates the disc at a sufficient speed, the disc will move outwardly from the hub 94 against the action of the spring 98 and engage with the flange 100, thus tending to hold the speed of the shaft 91 that carries the hub 94 substantially uniform.

Figure 7:
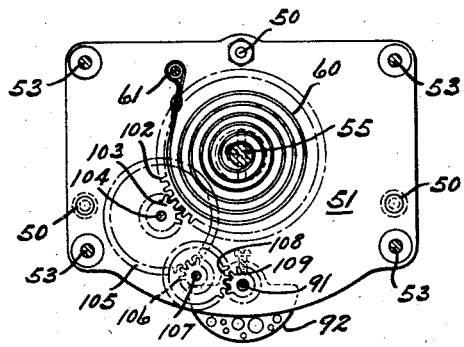
Fig. 7 is a view taken in the direction of the arrows along line 7—7 of Fig. 4.
Figure 8:
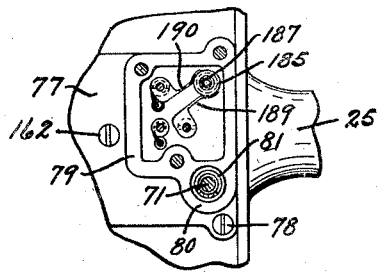
Fig. 8 is a detail view of the switch box and its connections, taken along the line 8—8 of Fig. 5.

The shaft 91 is rotated through a train of gears connecting it with the main drive shaft 55. Referring to Figs. 4 and 7, the shaft 55 has a hub 101 secured thereon in any suitable manner. This hub 101 carries a gear 102 which meshes with and is adapted to drive the pinion 103 secured to the shaft 104 rotatably supported by the plates 51 and 52. This shaft 104 is also provided with a gear 105 which in turn meshes with and drives a pinion 106 mounted on and rotatable with the shaft 107 which is also provided with a gear 108. A pinion 109 formed on or secured to the shaft 91 meshes with and is driven by the gear 108. This train of gearing between the shafts 55 and 91 is constructed and arranged as to cause the shaft 91 to be rotated at a definite increase of speed over that of the shaft 55, so the governor will function properly to hold the speed of the shaft 55 at substantially uniform rate.

As shown particularly in Figs. 1, 2 and 4, the main housing 20 is provided with an extension housing 110. This extension housing is provided with two oppositely-disposed ears 111 adapted to receive screws by means of which the housing 110 is secured to the end wall 21 of the main housing. The housing 110 has a snout-like end portion 112 hollowed out and screw-threaded to receive the cap 113. This cap in turn is provided with a longitudinal passage for receiving a reciprocating rod member or feeler 114. The one side of the housing is provided with a removable plate 115 held in position by means of screws 116. Inside the housing 110 there is formed a lug 117 having a longitudinal passage aligning with the passages in the cap 113. These two passages form bearings in which the feeler 114 is adapted to slide. A collar 118 is formed on the feeler 114. Spring 119 is interposed between the collar 118 and lug 117 and tends to move said feeler to the left as shown in Fig. 4, the collar 118 acting as a stop engaging the inner end of the cap 113 to limit this movement. The one end of the feeler 114 extends beyond the outer end of the cap 113 to permit it to be held in engagement with the object to be tested for vibration, see Figs. 3 and 4. The other end of said feeler extends through the lug 117 and has one end of the flexible connection, shown to be a chain 120, secured thereto by means of a pin 121. In order to prevent rotation of the feeler 114, two small pins 122 are provided in the lug 117, one on each side of the pin 121. These pins are of sufficient length to maintain the pin 121 between them during the reciprocation of the feeler 114.

The chain 120 passes over and around a shaft 124, its end being secured to the shaft in any suitable manner, preferably as shown in Fig. 4, and which includes a ball 125 secured to the end of the chain and which is insertable in a socket 126 formed in the shaft 124. The shaft is rotatably supported, one end being journaled in the wall of housing 110 while the other end is journaled in the lid 115. A sector-shaped arm 127 is formed on the shaft 124 and has an arcuate flange portion 128 concentric with the shaft. This arm 127 is normally held in its forward position, that is, a position toward the snout end of the housing 110 due to the action of the spring 119 on the feeler 114. However, any force on the said feeler to compress the spring 119 will permit the arm 127 to be moved toward the rear of housing 110 as will be explained hereinafter.

Figure 11:
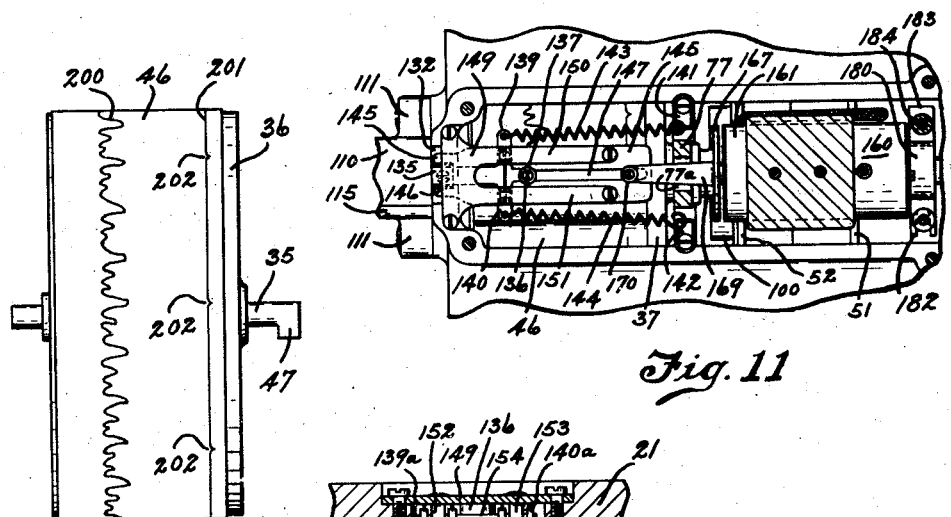
Fig. 11 is a detail view taken along line 11—11 of Fig. 10.

As shown in Figs. 4, 10 and 11, a flexible connector 130 in the form of a thin strip of sheet metal, has its one end connected to the front end of the flange portion 128 of arm 127 by the screw 131, so that the strip will ride on the outer surface of the flange 128. The connector 130 extends into the chamber 33 through an opening 132 provided in the end wall 21. This flexible connector 130 is secured to a plate 135 in any suitable manner preferably by welding. Said plate extends into the chamber 33, parallel with and adjacent to the flange 37 of drum 36. At the free end of the plate 135 there is secured a marker 136 comprising a tube 137 which adjustably supports the marking element 138 angularly of the drum flange 37. The plate 135 has oppositely-disposed ears 139 and 140 formed adjacent the marker 136. To these ears are respectively connected the one end of the springs 143 and 144. The opposite ends of these springs are connected to anchoring brackets 141 and 142 respectively. These brackets are secured in a passage formed in a depending portion 77a of the cover 77, which portion fits into a recess formed in the intermediate wall 26. This depending portion 77a of the cover 77 thus forms a removable part of the intermediate wall 26.

The springs 143 and 144 tend to move the marker 136 to the right as regards Figs. 4 and 11, when pressure is exerted on the feeler 114 to compress the spring 119. Thus a clockwise operation of the arm 127 and its shaft 124 is obtained. The spring 119, however, is so constructed and arranged as to overcome the effect of springs 143 and 144 so that when pressure on the feeler is relieved the spring 119 will move said feeler toward the left as regards Fig. 4, thus causing a counterclockwise movement of the arm 127 and, therefore, moving the marker 136 to the left against the action of the springs 143 and 144. The marker-supporting plate 135 operates between two parallel supporting plates 145 and 149. The plate 145 is anchored in the opening 132 by means of a screw, said plate extending into the chamber 33 adjacent and parallel with the flange 37 of the drum 36.

The plate 145 is so formed as to provide a support on which the plate 135 may slide as it is being reciprocated by the springs 143—144, and spring 119. The screw that maintains the plate 145 in position in the opening 132 also supports a U-shaped member 146, the plate 135 operating between the two upright arms of said U-shaped member which act as guides for maintaining the plate 135 in aligned position with the arm 127 when said plate is being reciprocated. The plate 145 has a slot 147 so arranged that the marking element 138 of the marker 136 extends therethrough, so that said marking element may engage with the record sheet 46 on the drum 36. The left end of the slot is so located that the marker 136 will engage with this end of the slot when the spring 119 has moved the stem 114 to its extreme left position as regards Fig. 4. This slot 147 is also constructed and arranged to receive a second marking device, which will be explained hereinafter.

Figure 14:
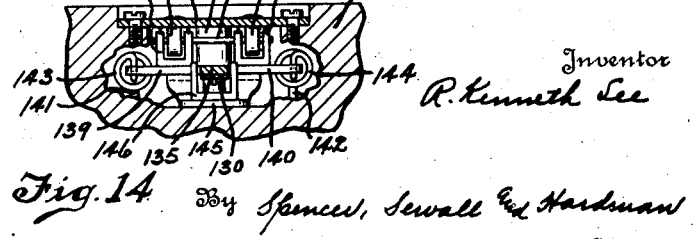
Fig. 14 is an enlarged view of the marker mechanism as shown in Fig. 10.

The other supporting plate 149 which maintains the plate 135 in position as it reciprocates, is anchored in the top surface of end wall 21, as shown in Figs. 11 and 14. This plate 149 has two inwardly-extending arms 150 and 151 parallel with the plate 145. On the inner ends of these arms there are secured standards 148 which are also secured to the plate 145, so that the plates 145 and 149 are rigidly connected at their inner extremities within the chamber 33.

As has been mentioned heretofore, the plate 135 is provided with two oppositely-disposed ears 139 and 140, to which the springs 143 and 144 respectively, are connected. On the ear 139 there are provided two perpendicularly-projecting portions 139a, so spaced as to receive a roller 152 therebetween. The ear 140 is similarly provided with projecting portions 140a which are adapted to receive a roller 153. A cross-shaft 154 journaled in the portions 139a and 140a, rotatably supports the rollers 152 and 153 in position between these perpendicular projections. The roller 152 engages with the lower surface of the arm 150 while the roller 153 engages with the lower surface of the arm 151 of supporting plate 149, so that when the marker-carrying plate 135 is moved backwardly and forwardly to cause the marking element 138 to make a graphic record on the recording sheet 46, said plate 135 slides along the supporting plate 145, while the rollers 152 and 153 provide a rolling bearing on the supporting plate 149.

The means for connecting the feeler 114 with the marker 136, as described, provides a motion-multiplying connection whereby the movement of the feeler will cause a proportionately increased movement of the marker. As has been stated, the feeler 114 is held in normal or inoperative position by means of a spring 119. The feeler 114 is connected to a rotatable shaft 124 by means of a flexible connection 120, in such a manner that operation of the feeler will cause or permit rotation of the shaft 124.

This shaft 124 supports a segmental arm 127 having an arcuate flange 128 concentrically arranged with said shaft. One end of a flexible connector is connected to the forward end of the arcuate flange 128, the other end of said connector extending into the chamber 33 and supporting the marker 136 which due to the action of spring 119 and described connections will be held in the normal, inoperative position as long as the feeler remains in its inoperative position. However, as soon as the feeler is moved to overcome the effect of the spring 119, springs 143 and 144 associated with the marker 136 will move said marker into operative position. Due to the flexible connection 120 of the feeler 114 being anchored to the shaft 124 which forms the fulcrum of arm 127 and the flexible connector 130 of the marker 136 being connected to said arm 127 at a distance from said fulcrum shaft 124, a movement of the feeler will permit a multiplied movement of the marker 136. In the present form the arm 127 is so constructed and arranged as to multiply the marker movement approximately seven times as regards the movement of the feeler so that if the feeler is moved one, one-hundredth of an inch the marker will be moved substatially seven one-hundredths of an inch, thereby delineating a record of increased size on the record-receiving surface.

The cover 77 is provided with an opening 155, which in turn is provided with a pane 155a of any suitable transparent material. By providing this opening, or what might be termed a "window", the operator may view the operation of the marker while it is recording vibrations. The pane 155a is provided with openings 156 and 157, so positioned that when the marker 136 is in normal inoperative position it will align with the opening 156 so that the operator may insert a screw driver through the opening in the pane to adjust the marking element 138 in its containing tube 137. This adjustment will vary the pressure of the marker on the drum. In order to assure perfect contact between the marker 136 and the record sheet 46, carried by the flange 37 of the drum 36, said flange is slightly eccentric with the shaft 35 with which said drum rotates. This eccentricity is so arranged that as the drum is rotated due to the unwinding of the main spring 60, the surface of the drum will slightly approach the marking element 138 of marker 136.

As has been mentioned heretofore, it is desirable to show the relation which the vibration curve bears to some definite part of the cycle of operation of the object tested. For this purpose, a device has been provided which includes a quick-acting electro-magnet which is adapted to operate a second marker for producing a graphic record of these operation cycles. The electro-magnet designated by the numeral 160, comprises a metal casing 161 secured to the cover 77 by means of screws 162. The electro-magnet is of the solenoid type and includes a coil having a central passage in which the reciprocating armature 163 operates. One end of this armature extends through the metal end cover 164 and has a reduced portion forming a shoulder against which one end of the spring 165 abuts. The opposite end of said spring abuts against a cup-shaped housing 166, which has a circular flange secured to the metal end cover 164 by means of a plurality of screws. This spring 165 normally tends to push the reciprocating armature 163 toward the left, as viewed in Fig. 4. The end of the armature 163 opposite the spring 165, has a head plate 167 normally spaced away from the metal casing 161. The movement of the armature 163 to the left as in Fig. 4, is limited by the stop screw 168 which is mounted in the projection 77a of the cover 77. This screw is adjustable and is provided with a lock nut for locking the screw in any adjusted position. The electro-magnet when energized, has a magnet field including the metal casing 161, the metal end cover 164 and the armature plate head 167, a gap being provided between the plate head 167 and the metal frame 161, so that when the electro-magnet is energized, magnetic attraction will draw the plate head 167 toward the magnet casing 161, moving the armature 163 to the right against the effect of the spring 165.

The plate head 167 has a finger 169 secured thereto which extends through an opening projection 77a of the cover 77 into the chamber 33. A marker 170, including the marking element 171, is secured to the free extreme end of the finger 169, the marking element 171 extending through the slot 147 in the plate 145 and engaging with the record sheet 46 on the drum flange 37. From the foregoing it will be seen that movement of the armature 163, and thus movement of its plate head 167 will tend to cause lineal movement of the marker 170, thus tending to make a jog in the line made on the record sheet by the marking element 171 each time the electro-magnet is operated.

The electro-magnet is provided with operating means so that it will be moved once at some definite position in the cycle of operation of the object being tested.

Figure 3:
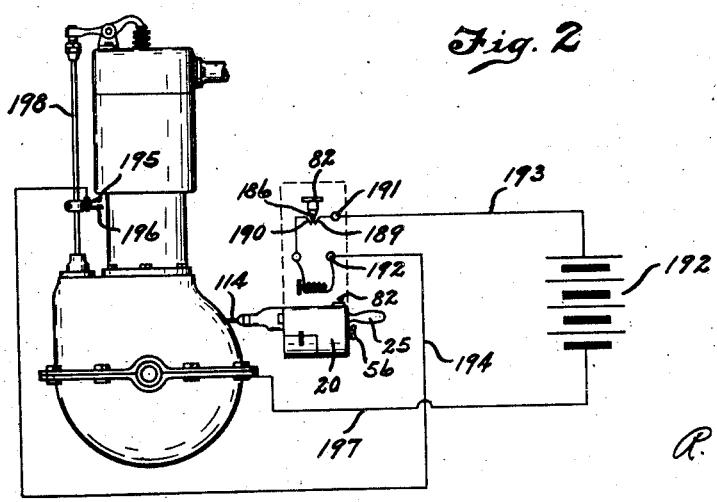
Fig. 3 is a view diagrammatically showing all the electrical connections of the device and its application to the crank case of an engine for taking vibration tests.

By referring to Fig. 3, the means for operating the magnet includes a circuit-making-and-breaking device mounted on the rod which operates one of the valves of an internal-combustion engine. It may be seen that when the rod moves upwardly to open the valve and when said rod reaches a predetermined position, the circuit make-and-break device will close. Other means are provided which are under the control of the operator, and by means of which the operator may cause the electro-magnet to function concurrently with the releasing of the drum-driving mechanism. This means includes the operating button 82 carried by the trigger 71. The trigger 71 has been described as including an enlarged head portion 83, to limit its outward movement due to the action of the spring 81. This head portion 83 also acts to operate the electro-magnet controlling switch in the following manner:

The barrel portion of the cup-shaped element 166 against which one end of the spring 165 abuts, forms the fulcrum point and mounting element for a dog 180, which is provided with oppositely-disposed ears 183 and 182. The ear 182 is bifurcated, which permits the reduced portion of the trigger 71 to project between the two arms formed at this bifurcated end. The enlarged head portion 83, however, will engage with the two arms formed by the bifurcation of the ear 182, when the operating button 82 is depressed. Thus the dog 180 will be operated in a clockwise direction as regards to Fig. 6. The ear 183 engages with the plunger 184 which extends beyond the lower surface of the cover 77. This plunger 184 is constructed of any suitable non-conducting material and extends up through the cover 77 into the shell portion 79, said plunger having an enlarged head portion 185 in the chamber formed in the shell portion 79. A conducting ring 186 is provided, surrounding the lower portion of the head 185. A spring 187 having one end inserted in a bore formed in the head 185, has its other end resting against the cover 188 made of any suitable insulating material, said spring tending to force the lower portion of the head 185 into engagement with the bottom of the chamber in the shell 79.

Two contact elements 189 and 190 oppositely-disposed, are carried by the insulated cover 188, having free ends engaging with the head 185 above the conducting ring 186. The contact element 189 is provided with a terminal 191 extending on the outside of the insulated cover 188. The other terminal 190 is connected with one end of the electro-magnet winding. The opposite end of the electro-magnet winding is connected to the terminal 192. From the foregoing it will be seen that when the dog 180 is rotated clockwise by the operation of the trigger-operating button 82, the plunger 184 will be moved upwardly against the effect of spring 187, thereby tending to bring the metal ring 186 carried by the head portion 185, into engagement with the free ends of the fingers of contacts 189 and 190, thereby completing a connection between these two contacts which will permit current to flow from one to the other.

Referring now to Fig. 3, the electrical circuits may readily be followed: As soon as the operating button 82 is depressed to close the circuit connection between contacts 189 and 190, current will flow from the source of current, shown to be a storage battery 192, through the wire 193, the terminal 191, thence through contact 189 across and through the metal ring 186 to contact 190, thence through the winding of the electro-magnet 160 to the terminal 192 and through the wire 194 to the movable contact 195 of the make-and-break device which when moved into engagement with the stationary contact 196 will conduct the current to the ground connection on the engine, thence back to the opposite side of the battery via the ground wire 197. Thus it will be seen that whenever the valve-operating rod 198 in this instance reaches a predetermined point, the electro-magnet 160 will be energized, causing the armature 163 to be moved to the right as regards Fig. 4, against the effect of the spring 165. This in turn will cause a quick movement of the marker 170 which in turn will provide a jog in the line made by the marker 171 on the record sheet 46.

When the operator desires to test an object for vibration, say for instance, testing an internal-combustion engine, the device is held so that the reciprocating rod 114 will engage with the engine at any desired point, as shown in Fig. 3. Pressure is exerted on the device so that the rod 114 will be slightly moved into the housing 110 toward the arm 127. This will cause the springs 143—144 to contract and move the marker 136 toward the intermediate wall 26. The main spring 60 having been wound previous to this, by means of turning the winding handle 56 in a clockwise direction looking from the front end of the device, the operator as soon as he desires to obtain the vibration curve, depresses the operating button 82 which causes the trigger 71 to move the ratchet 67 to release the lip 66. This permits the spring to unwind and rotate the drum 36 in a clockwise direction as viewed from the front of the device. Vibrations will cause reciprocating movement of the rod 114, thus permitting the differential tension between the springs 143—144 and spring 119, to cause reciprocation of the marker 136, thereby to provide a mark or curve on the record sheet, as shown at 200 (see Fig. 13). This mark is made on the entire length of the sheet which substantially surrounds the peripheral flange 37 of the drum 36.

Figure 13:
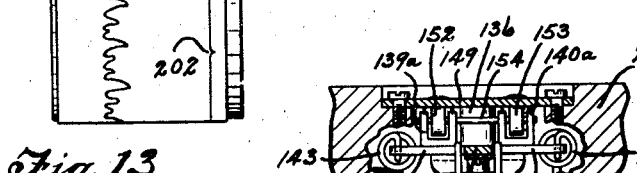
Fig. 13 is a detail view of the drum element and a record-bearing sheet secured thereto.

Now, when it is desired to compare the vibration curve with cycles of operation on any portion of the device being tested for vibration, the connections, as described relative to Fig. 3, are completed. Now, when the operator depresses the button 82 to cause functioning of the vibration-recording device, the electrical elements of the device will also function as has been described, to provide the line 201, as shown in Fig. 13, having jogs 202 which indicate the same point in the cycle of operation of one of the moving elements of the device being tested for vibrations.

The record sheet in the present instance comprises a sheet of paper chemically treated, so that marking elements 138 and 171 of the markers 136 and 170, may be made of brass, which when engaging with the chemically-treated paper, will cause a graphic registration of the movements of the marking devices. It will, of course, be understood that any type of marking element may be used with any suitable type of record sheet, the use of the material being described, however, being most suitable to eliminate undue wearing down of the marking elements.

While the form of embodiment of the invention as herein disclosed, constitutes a preferred form, it is to be understood that other forms might be adopted, all coming within the scope of the claims which follow.

What is claimed is as follows:

1. In a vibration recording device, the combination of a record sheet and a marker therefor, of means for operating the marker comprising a feeler adapted to engage the vibrating member, a flexible strap between the feeler and marker and differential springs connected with the feeler and marker respectively.

2. In a vibration recording device, the combination of a record sheet and a marker therefor, means for operating the marker comprising a feeler adapted to engage the vibrating element, a flexible strap connecting the feeler and marker, a spring on the feeler adapted to move it, so that the flexible strap is held tight and the marker is held in normal position relative to the record sheet, and a spring of lesser strength than the first mentioned spring connected to the marker and adapted to move said marker in accordance with movements of the feeler.

3. In a vibration recording device, the combination of a record sheet and a marker therefor, of a reciprocable plunger adapted to be moved by the vibrating element, motion transmitting and multiplying means between the plunger and the marker comprising, a pivoted shaft carrying a segmental arm having an arcuate surface, flexible means connecting the plunger with said shaft, a flexible member connecting the marker with the end of the arcuate surface farthest from the marker, a spring on the plunger normally holding it so that the marker is held in one extreme position relative to the record sheet and a tension spring of less strength than said first mentioned spring for moving the marker toward its other extreme position relative to the record sheet in accordance with movements of the plunger.

4. In a vibration recording device, the combination with a record sheet and a marker therefor, of a reciprocable plunger adapted to engage the vibrating element, a spring on the plunger yieldably holding it in normal position, flexible connections between the plunger and marker capable of moving the marker only toward its normal position relative to the record sheet and a tension spring connected with the marker for moving it out of its normal position in accordance with the movement of the plunger.

In testimony whereof I hereto affix my signature.

R. KENNETH LEE.